United States Patent [19]
Delmer et al.

[11] Patent Number: 5,620,143
[45] Date of Patent: Apr. 15, 1997

[54] CONSTANT-FLOW IRRIGATION TAPE AND METHOD OF MAKING

[75] Inventors: William Delmer; Daniel Delmer; Robert Delmer; John W. Erickson; Ray C. Emmons, all of Huntington Beach, Calif.

[73] Assignee: Drip Tape Manufacturers & Engineers, Inc., Huntington Beach, Calif.

[21] Appl. No.: 328,105

[22] Filed: Oct. 24, 1994

[51] Int. Cl.⁶ .................................................. B05B 15/00
[52] U.S. Cl. .......................... 239/542; 239/547; 239/562
[58] Field of Search ........................... 239/533.1, 533.13, 239/542, 547, 562, 566, 567, 463, 464, 553, 272; 138/34, 37, 42, 44, 45

[56] References Cited

U.S. PATENT DOCUMENTS

| | | | |
|---|---|---|---|
| 385,743 | 5/1975 | Wake | 239/272 |
| 4,009,832 | 3/1977 | Tiedt | 239/542 |
| 4,047,995 | 9/1977 | Leal-Diaz | 156/203 |
| 4,247,051 | 1/1981 | Allport | 239/542 |
| 4,473,191 | 9/1984 | Chapin | 239/542 |
| 4,548,360 | 10/1985 | Delmer et al. | 239/542 |
| 4,722,759 | 2/1988 | Roberts et al. | 156/203 |
| 4,880,167 | 11/1989 | Langa et al. | 239/547 |
| 5,052,625 | 10/1991 | Ruskin | 239/542 |
| 5,118,042 | 6/1992 | Delmer | 239/542 |
| 5,192,027 | 3/1993 | Delmer et al. | 239/542 |
| 5,252,162 | 10/1993 | Delmer | 156/203 |

OTHER PUBLICATIONS

Add sheet entitled "Ro-Drip® Features/Advantages" of Roberts Irrigation Products, Inc. no date available.

Primary Examiner—Andres Kashnikow
Assistant Examiner—Lisa Ann Douglas
Attorney, Agent, or Firm—Pretty, Schroeder, Brueggemann & Clark

[57] ABSTRACT

A constant-flow drip irrigation tape hose includes a primary flow path communicating water along the length of the hose. A secondary drip-flow path leads from the primary flow path to an emitter site outwardly of the hose. The hose is formed with a pair of variably spaced apart walls at least one of which is formed with a continuously-open channel defining part of the secondary flow path. A second variable-area part of the secondary flow path is defined by radial spacing of the pair of walls from one another. At least one of the pair of walls is responsive to internal water pressure in the primary flow path to open and close the variable-area part of the secondary flow path in response, respectively, to decreasing and increasing water pressure in the hose. A plurality of emitter sites are spaced regularly along a length of the hose. Consequently, the hose has at least one pressure range within which it provides a nearly constant drip-flow irrigation rate to plants of a row crop as the water pressure within the hose decreases over the length of an elongate run of hose.

30 Claims, 7 Drawing Sheets

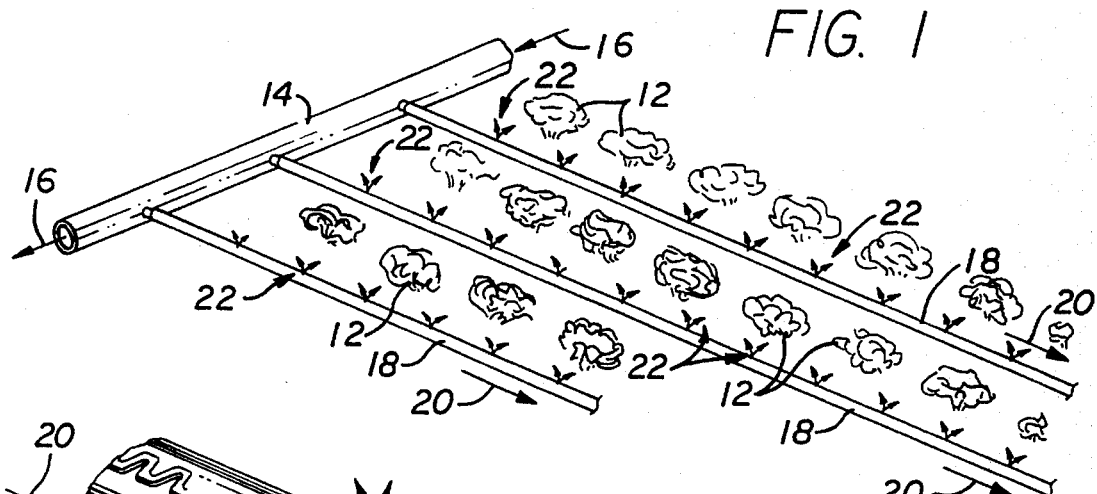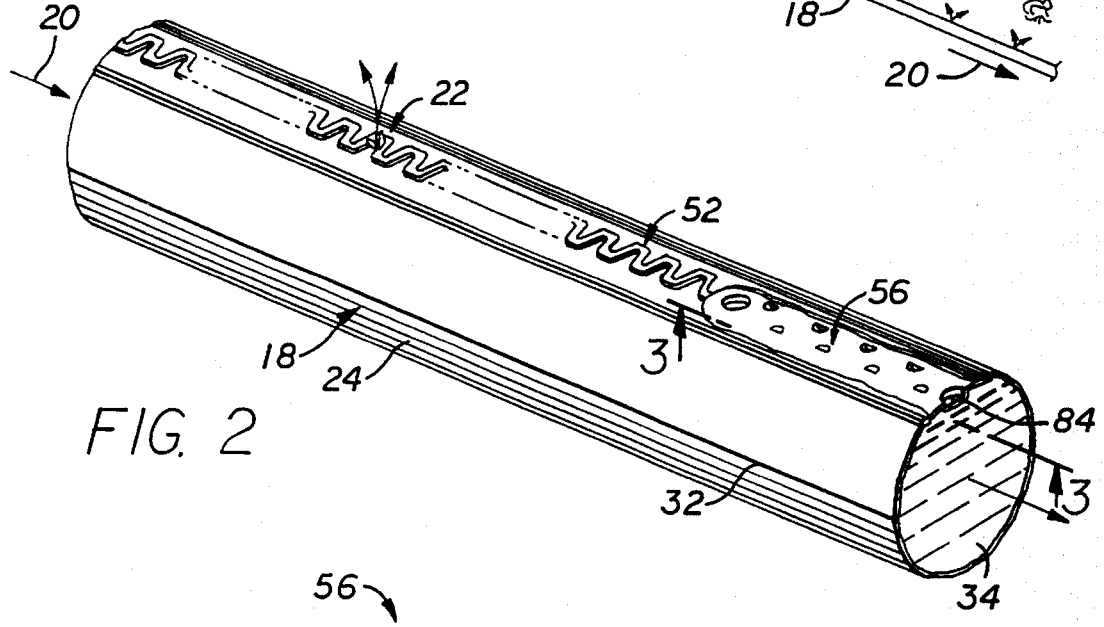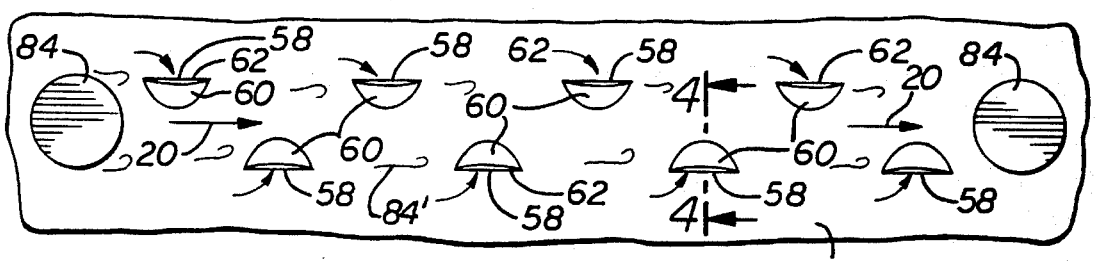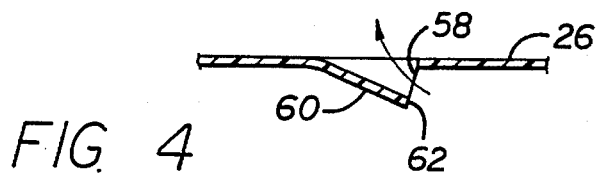

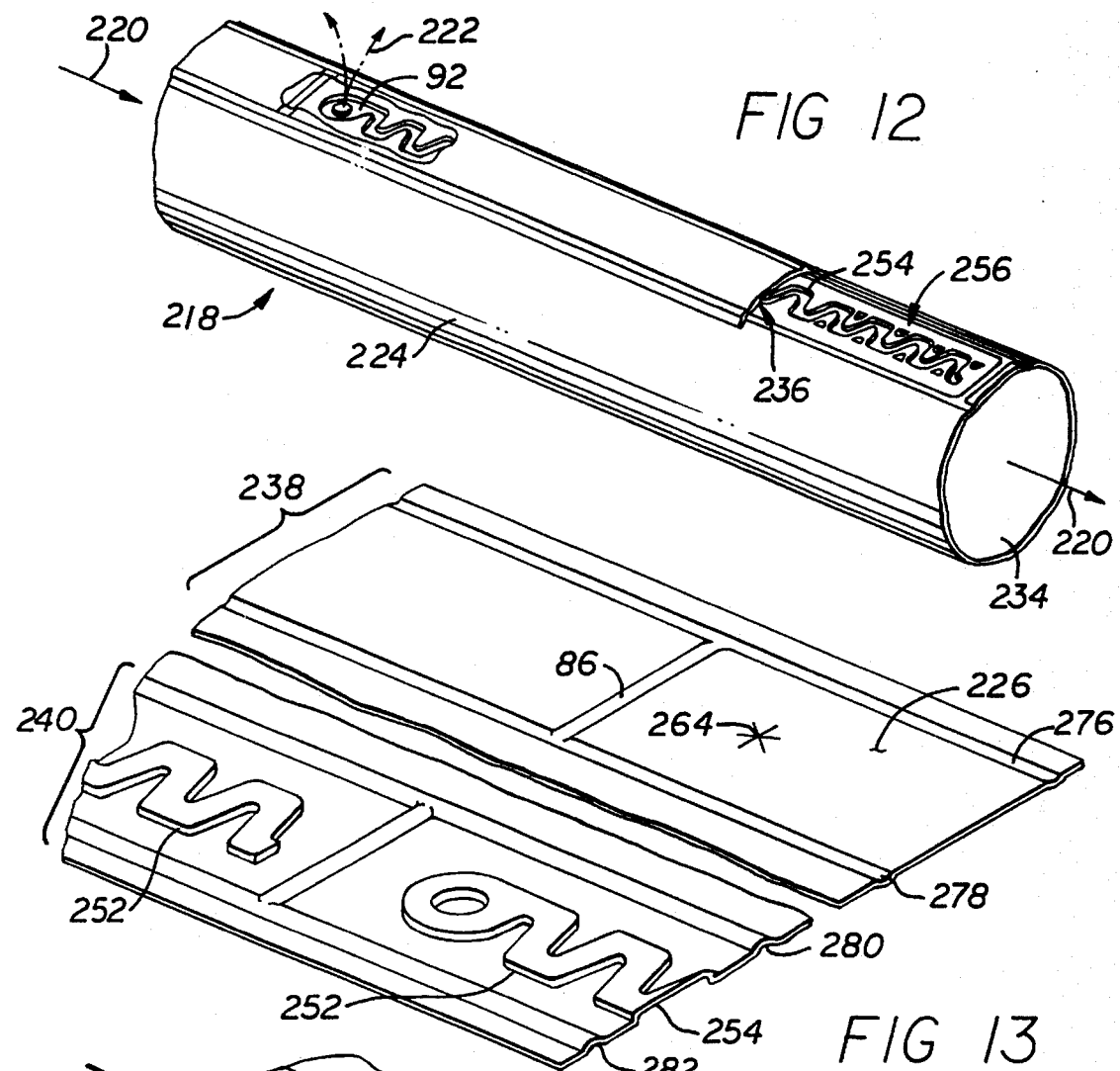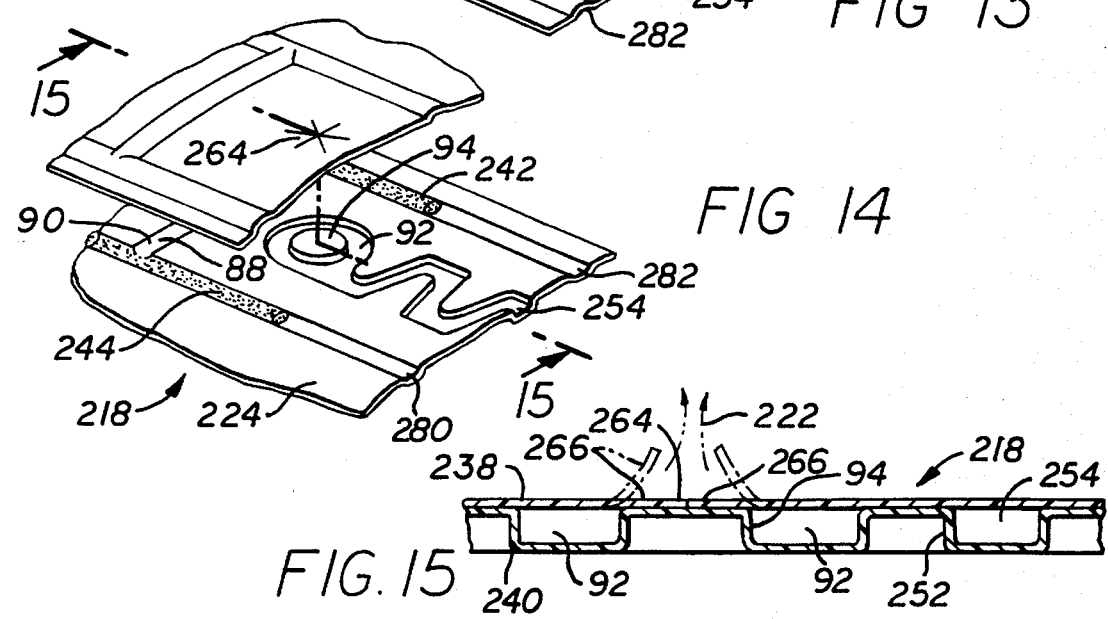

CONSTANT-FLOW IRRIGATION TAPE AND METHOD OF MAKING

BACKGROUND OF THE INVENTION

1. Field of the Invention

The present invention relates to agricultural irrigation. More particularly, the present invention relates to a tubular flexible hose, or tape, which is used to distribute water substantially uniformly at discreet locations spaced along its length. Such "tape" hoses are creased longitudinally so that when they are not filled with water under pressure they collapse to a flat tape-like configuration. Such tapes are more easily rolled, transported, and stored than are hoses which remain always round in cross section. Consequently, the present invention relates to hose structure of the type generally recognized as "drip irrigation tape". Such drip irrigation tapes are widely used in row-crop farming so that irrigation water is distributed to the soil immediately adjacent to the growing plants, and the entire field need not be irrigated. The use of such irrigation tapes results in considerable reduction in water use, loss of fertilizer, and accumulation of mineral salts in arable agricultural soils.

2. Related Technology

A conventional hose for irrigation use is known in accord with U.S. Pat. No. 4,047,995, issued 13 Sep. 1977. This conventional irrigation hose is made from an elongate strip of thin plastic film which is either folded or wrapped sealingly on itself, or with a similar strip of plastic film, so that two layers of the plastic film are partially or fully overlapped and sealed together in facial contact. The strip or strips of plastic film form an elongate primary flow path along which a large-volume flow of irrigation water may pass. In order to provide plural small drip-like water flows outwardly of the hose, the plastic film is not sealed to itself, or to the other strip of plastic film, in selected areas spaced along the length of the hose. These areas define elongate tortuous patterns communicating from the primary flow path outwardly of the hose. Consequently, when the hose is supplied internally with pressurized water, the areas where the plastic film is not sealed together separate slightly to form secondary drip flow paths and to allow water to seep between the layers of plastic film to plural spaced-apart fine-dimension outlets on the hose at which a dripping water flow may take place. That is, the areas where the plastic film is not sealed either to itself or to the similar strip of plastic film defines plural fine-dimension tortuous, serpentine, or elongate and constricted secondary flow paths spaced along the length of the hose and each leading from the longitudinal primary water flow path outwardly to respective spaced-apart outlet ports along the length of the hose.

With an irrigation hose according to the '995 patent, the rate of dripping water flow from the outlets of the hose decreases along a length of the hose as the water pressure within the hose decreases. This decrease in water pressure level in inescapable because of friction resulting from the flow of the water, and the fact that water volume in the hose decreases as the water is metered out through the dripping outlets. The result is that irrigated plants near the water inlet end of the hose may receive an excess of water. Near the center of a run of this hose, the irrigated plants may receive the desired amount of water, and near the far end of the hose away from the water inlet, the irrigated plants will receive too little water.

Also, the size of the tortuous or serpentine passages through which dripping water flow must escape the hose are so small that they are easily clogged by debris and particulates in the hose. Moreover, the water used for irrigation purposes may not be (and generally will not be) potable water. Consequently, this water will frequently carry bacterial slime, algae, and particulates which can quickly plug the small metering passages of a hose like that taught by the '995 patent. Further, because these metering passages only really open when the hose is pressurized, and are otherwise closed, once they become clogged they will remain clogged. Relief of internal water pressure on this hose has the effect of allowing the drip passages to constrict and trap clogging contaminants in these passages. Further, the inlets to the tortuous metering drip passages of this hose are disposed at a crevice or bite between the overlapped sheets of plastic film. Consequently, the primary water flow is not particularly vigorous or turbulent as it passes these inlets. Again, the result is a hose with drip outlets which clog easily and which will not unclog. Finally, this hose provides outlet openings on the hose which allow reflux of environmental water and contamination into the metering passages. This reflux of water and contamination may clog the dripping outlets. Also, small plant roots may find their way into the outlets on the hose, and again may clog the dripping outlets.

Another conventional drip irrigation hose which attempts to solve the problem of inconsistent water outlet dripping flow rate along the length of a run of the hose is known in accord with U.S. Pat. No. 4,009,832, issued 1 Mar. 1977. The hose taught by the '832 patent the primary water flow path is made by an elongate strip or strips of plastic film which are partially or fully overlapped and sealed together to form a primary water flow path. An inner flap or inner wall portion of the hose cooperates with an outer wall portion of the hose to define a throttling gap. This structure results in a drip irrigation hose which is more nearly uniform in its rate of water delivery despite varying pressure over a length of the hose.

However, consideration of the structure for the drip irrigation hoses set forth in the '832 patent will reveal that this hose suffers from many of the deficiencies described above with respect to the hose of the '995 patent. For example, even though the '832 patent asserts that the hose is self cleaning with respect to being able to flush out contaminants (i.e., slime, algae, and particulates) because the flap portion of the inner wall will open up the metering or throttling gap when the hose is open for flushing, it is seen that the inlets from the primary flow path of this hose to the secondary flow path and drip outlets is still defined either at a crevice or bite along the length of the hose, or as simple holes perforating the inner wall perpendicularly to the axis of the primary flow path. Primary water flow at these inlets to the secondary flow paths will be rather sluggish and contaminants can easily enter these inlets. Further, flushing of the hose to remove contaminants clogging the secondary flow paths can have only a limited effect because the flap portion of the hose wall inherently must have an initial contacting relationship with the overlying wall portion even when the hose in not under pressure. Were the hose constructed otherwise, this flap portion would not form a pressure drop for the metered water flow and would not be urged into metering relationship with the outer wall of the hose. Consequently, this flap will not in fact move out of engagement with the overlying wall portion of the hose sufficiently to release clogging contaminants.

Yet another conventional drip irrigation hose is known in accord with U.S. Pat. No. 4,247,051, issued 27 Jan. 1981. The drip irrigation hose according to the '051 patent is formed similarly to the hoses discussed above, with modifications directed to reducing clogging of the drip outlets of the hose. More particularly, the size of the tortuous, serpentine, or elongate and restrictively small sized secondary flow passages extending between the primary water flow path of the hose and the drip outlets of the hose are increased so that it is not so easily clogged by contaminants. However, the flow rate of water through the secondary flow paths is controlled by the configuration of these pathways so that water drip flow rates are maintained. The hose is formed with elongate ribs spacing the overlapped walls of the secondary metering flow path away from one another. These ribs may be formed by adhesively securing a non-adhesive elongate spacer, such as a monofilament fishing line, between the overlapped walls of the hose.

An assertion for the hose provided by the '051 patent is that the inlet and outlet holes of the secondary metering passages may be of sufficient size as to not easily clog. Also, the water flow velocity in the secondary metering passages is asserted to be sufficiently high that self-cleaning of the inlet and outlet holes is provided. However, a close consideration of the structure presented by the '051 patent suggests that the objectives for this irrigation hose may not be realized in fact. Slotted intake opening to the secondary flow paths are provided in one embodiment of this patent, with no particular explanation of why these slotted openings would not themselves clog with contaminants. A flexible flap type of outlet valve is provided also by an embodiment of this invention, which valve is configured so that it presents a flow constriction and may not open wide in the event it becomes partially clogged, so that the clogging material would be ejected. The result is that the outlet valve could easily clog and the irrigation hose of the '051 patent includes features which defeat the purpose of providing an irrigation hose with reduced clogging.

Still another conventional irrigation hose is known in accord with U.S. Pat. No. 4,722,759, issued 2 Feb. 1988. This irrigation hose provides a longitudinal primary flow path communicating with a longitudinal secondary flow path via spaced apart inlets which are controlled by an inner flap portion of the overlapped walls of the hose to throttle water flow responsive to the local pressure level of the water. At spaced apart drip outlets of this hose, the overlapped walls of the hose have a respective break in a longitudinal heat-sealed seam between the overlapped walls. Consequently, the walls of the hose may separate slightly to allow water outflow at these outlets to the crops to be irrigated. Similarly to the irrigation hoses considered above, however, the hose of the '759 patent defines inlets to the secondary flow paths which are at a crevice or bite internally of the hose. Again, primary water flow at these inlets could not be vigorous under normal irrigation use conditions for the hose. Accordingly, frequent clogging of these inlets to the secondary flow paths could be expected with this hose.

Additional conventional drip irrigation hoses or tapes are known in accord with U.S. Pat. Nos. 4,548,360, issued 22 Oct. 1985; 5,118,042, issued 2 Jun. 1992; 5,192,027, issued 9 Mar. 1992; and 5,252,162, issued 12 Oct. 1993, all of which are assigned to the assignee of the present application.

In view of the interest in developing drip irrigation hoses which provide a more nearly constant irrigating water flow along a run of the hose despite the reduction in internal water flow pressure which occurs along a hose run, the California Agriculture Technology Institute has provided a formula by which the uniformity of water delivery may be measured. The Institute's publication No. 92100 sets out the formula $Q=K(H)^x$, where H is local primary water pressure (i.e., at the inlet end of a drip-flow path of the hose leading to a water outlet), Q is the rate of water flow from the drip-flow outlet of the hose, and K is a constant. If "x" falls in the range from 0.5 to 1.0, the hose is considered not to be pressure compensated. That is, the delivery rate of water from the drip-flow outlets of the hose is simply a function of the internal water pressure existing in the hose at particular locations along the length of a run. Such a hose has the classic problem of over watering plants near the inlet end of the hose and under watering plants at locations distant from this inlet end. If the value of "x" is less than 0.5, then the hose is considered to be pressure compensated, and the drip-flow irrigation rate is not simply a function of applied water pressure but is somewhat independent of the internal water pressure at particular locations along the length of a hose run. Such an irrigation hose provides a more uniform water delivery along the length of a long run of the hose. Ideally, if the value for "x" is zero the hose is fully pressure compensated, and the irrigating drip-flow rate would be constant irrespective of internal water pressure. Such an idealized irrigation hose does not exist.

SUMMARY OF THE INVENTION

In view of the deficiencies of the conventional related technology, a primary object for this invention is to provide an irrigation tape which avoids one or more of these deficiencies.

An additional object for this invention is to provide a drip irrigation hose which has a substantially constant rate of water delivery along its length over a wide range of internal water pressures.

Still another object is to provide such a drip irrigation hose which has two discreet ranges of substantially constant drip irrigation water delivery, each having a corresponding range of internal water pressures so that a user of the hose may choose to irrigate plants either in a light watering range or in a heavier watering range of the hose dependent upon which internal water pressure the user chooses to supply to the hose.

Another object for this invention is to provide such an irrigation hose which has the ability to clear itself of clogging contamination upon the relief and reapplication of water pressure in the hose.

Yet another object for this invention is to provide a drip irrigation hose with water inlet features leading from the primary water flow path to the secondary drip-flow paths which resist clogging by contaminants in the hose.

Still further, another object for this invention is to provide a drip irrigation hose which includes turbulence enhancing features effective upon flushing through of the hose to scrub the inlets to the secondary drip flow paths free of contamination and debris which may have lodged at these inlets.

Still further, another object for the present invention is to provide such an irrigation hose which allows the secondary drip-flow channels to be sized as large as is practicable so that contamination which does enter these passages will pass through without clogging the hose.

Yet another object for this invention is to provide such a drip irrigation hose which includes features closing the drip-flow outlets of the hose when water is not being discharged therefrom, which will open widely enough to allow contamination to be ejected from the hose so that this contamination does not clog the hose at the drip-flow outlets, and yet which will resist the reflux of environmental water into the hose and also will resist the entry of plant roots into the hose.

Accordingly, the present invention provides a drip irrigation hose of the type having an elongate primary water flow path extending therethrough and a drip-flow secondary flow path extending from the primary flow path to open outwardly of the hose, the drip irrigation hose including a hose body with a wall circumscribing and bounding the primary flow path, the wall including a first wall portion and a second wall portion which are overlapped and sealingly connected to one another to define the secondary flow path therebetween, one of the first wall portion and the second wall portion defining a tortuous continuously-open channel forming a part of the secondary flow path, and the first and the second wall portions being variably spaced from one another to define a variable-area part of the secondary flow path, one of the first wall portion and the second wall portion being pressure-responsive to move toward the other of the first wall portion and the second wall portion to constrict the variable-area part of the secondary flow path in response to increasing water pressure within the hose.

These and additional objects and advantages for the present invention will be apparent from a reading of the following detailed description of several exemplary embodiments of the present invention, taken in conjunction with the appended drawing figures, which are briefly described below.

BRIEF DESCRIPTION OF THE DRAWINGS

FIG. 1 provides a fragmentary perspective view of an irrigated field in which plural constant-flow drip irrigation tape hoses according to the present invention are in use to irrigate growing plants;

FIG. 2 is a fragmentary perspective view of a section of the constant-flow drip irrigation tape hose seen in FIG. 1, with portions of the structure broken away and removed for clarity of illustration;

FIG. 3 provides an enlarged fragmentary view taken at arrows 3—3 of FIG. 2, and showing in internal feature of the drip irrigation tape hose seen in FIGS. 1 and 2;

FIG. 4 is a fragmentary cross sectional view taken at line 4—4 of FIG. 3;

FIG. 12 provides a fragmentary perspective view similar to that of FIG. 2, but illustrating an alternative embodiment of the present constant-flow drip irrigation tape hose;

FIGS. 13 and 14 provide fragmentary perspective views of steps in the process of making a drip irrigation tape hose as seen in FIG. 12;

FIG. 15 is an enlarged fragmentary cross sectional view taken at line 15—15 of FIG. 14;

DETAILED DESCRIPTION OF THE PREFERRED EXEMPLARY EMBODIMENTS OF THE INVENTION

Figure 5:
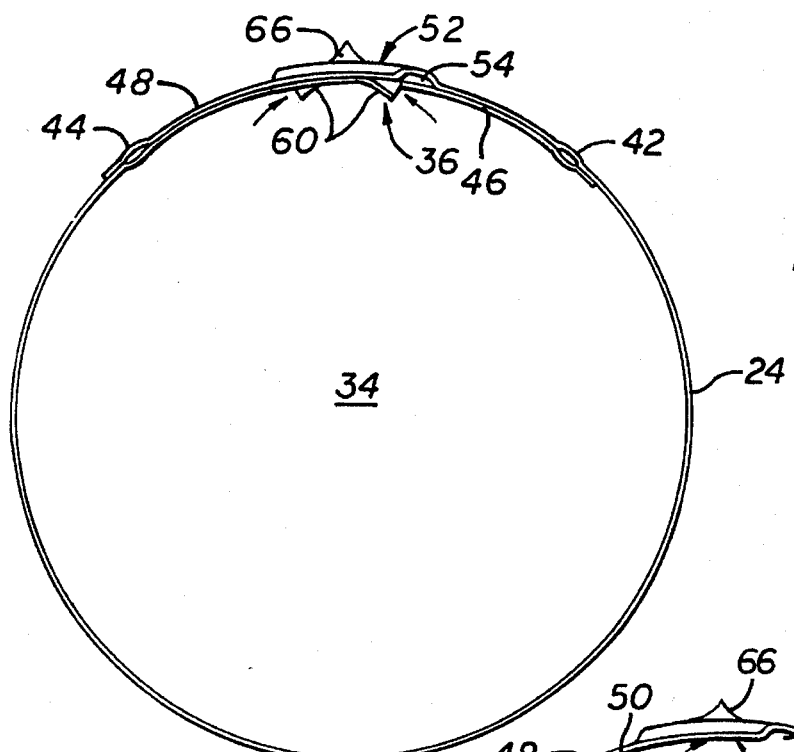
FIGS. 5 and 6 provide enlarged axial views of the constant-flow drip irrigation tape hose seen in FIGS. 1–4, and in two alternative operating conditions dependent upon the internal water pressure carried by the hose.

Viewing now FIG. 1, a field 10 is seen to include growing plants 12 which are arranged in rows. A manifold pipe 14 extends across the field 10 at one end thereof. This manifold pipe carries irrigation water, as is indicated by the arrows 16. Connecting with the manifold pipe 14 is a plurality of elongate constant-flow drip irrigation tape hoses 18. The drip irrigation tape hoses 18 extend in long runs generally perpendicularly from the manifold pipe 14 along the length of the rows of growing plants 12. The tape hoses 18 also carry irrigation water, as is indicated by the arrows 20. Spaced regularly along the length of each tape hose 18 is a plurality of drip sites, indicated with the arrows 22. The drip sites 22 will ordinarily be spaced from about 6 inches to about 12 inches apart. From the drip sites 22 issues a dripping flow of irrigation water to the growing plants 12. This dripping flow of water will be at a selected rate of from about 0.05 gallon per hour to about 1.0 gallon per hour.

Generally, the tape hoses 18 are dead-headed at their ends remote from the manifold pipe 14. That is, the remote ends (not seen in the drawing Figures) of the drip irrigation tape hoses 18 are simply clamped shut. Consequently, all of the water which enters a particular run of the drip irrigation tape hose 18 will be discharged therefrom via the drip irrigation sites 22 along the length of hose. During irrigation use of the tape hoses 18, the water flow rate in the tape hoses 18 is rather slow, and is at a controlled pressure of about 4 to about 15 psig at the end of the runs adjacent to the manifold pipe 12. Understandably, the water pressure within each hose 18 decreases along the length of each run. That is, because the tape hoses 18 may be any where from a few feet in length to a thousand feet or more in length, the flow-friction pressure losses and volume-loss pressure losses in the tape hoses 18 combine to produce a considerable difference in the internal water pressure within each hose at its end next to the manifold pipe 14 as compared to the water pressure at the remote dead-headed end of each hose 18.

Also, all of the contaminating bacterial slime, algae, and particulates which enters a run of the tape hose 18 will be trapped therein. Ordinarily, users of such drip irrigation tape hoses occasionally will open the clamp at the remote end of each run and allow a few minutes during which the water can flow freely and flush through the hose to remove contamination. The effect of this flushing water flow will be explained further hereinbelow.

Figure 6:
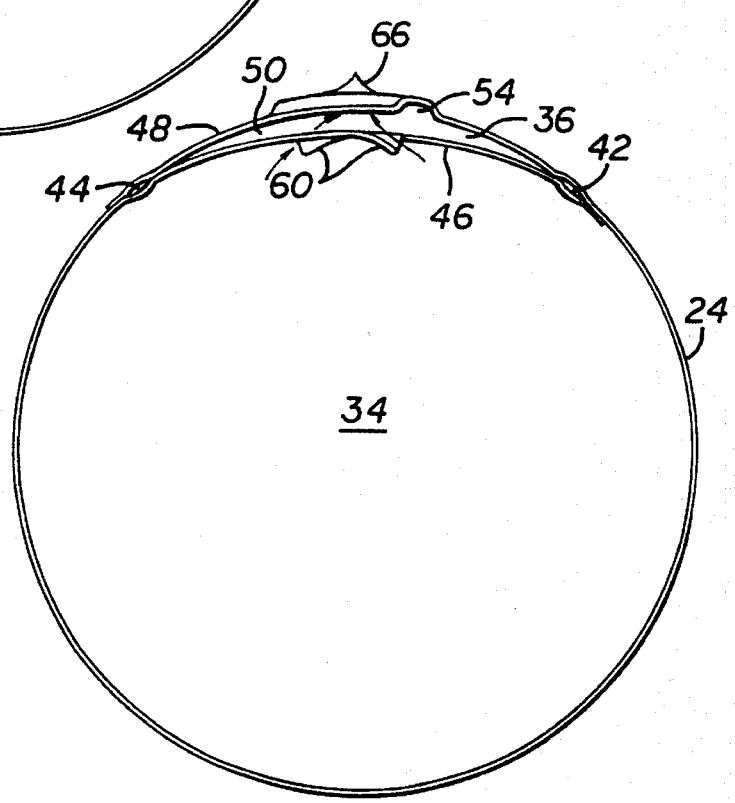
Figure 7:
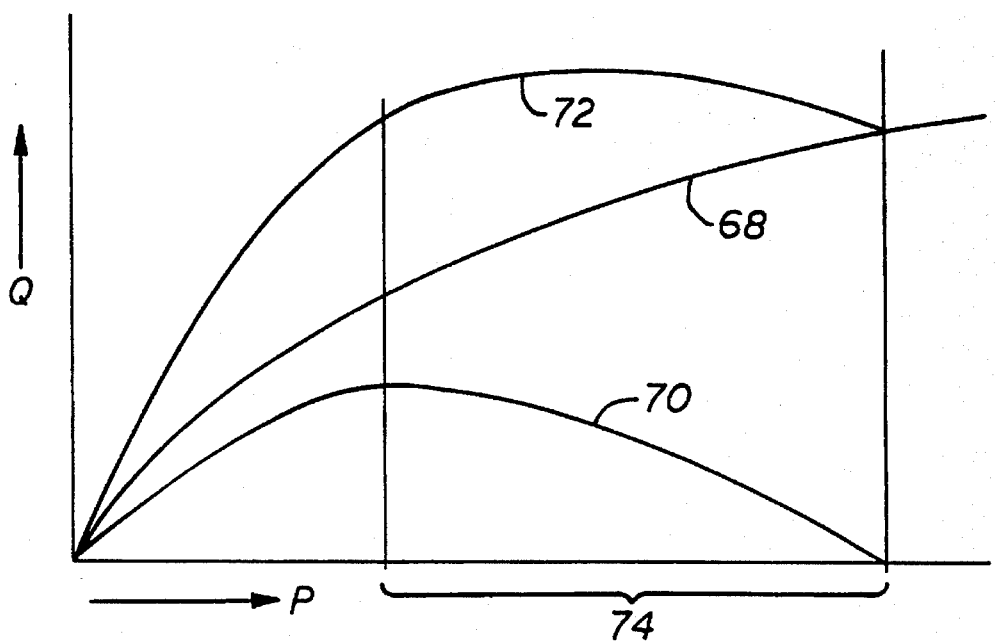
FIG. 7 graphically represents operation of the constant-flow drip irrigation tape hose seen in FIGS. 1–6.
Figure 8:
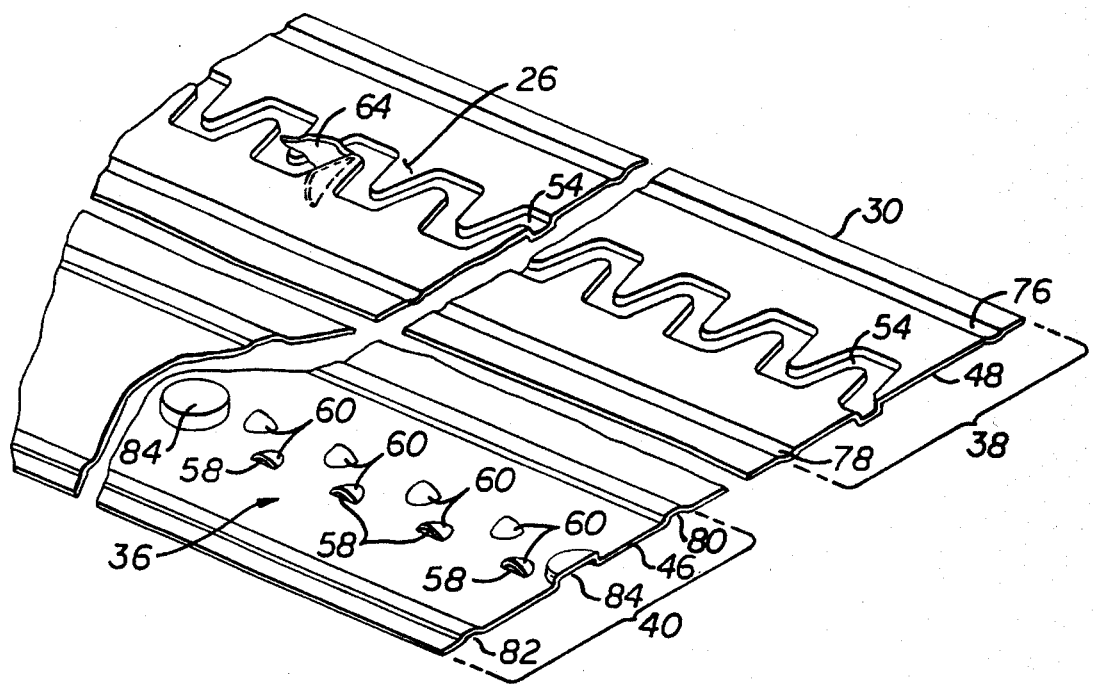
FIGS. 8 and 9 illustrate steps in the process of manufacturing a constant-flow drip irrigation tape hose according to the preceding drawing Figures.
Figure 9:
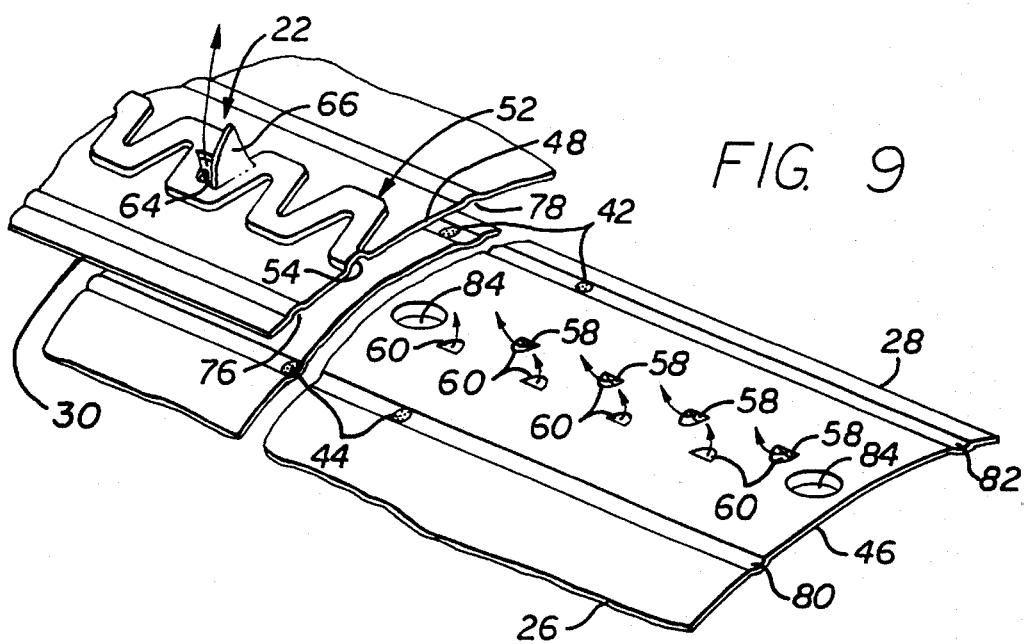

Viewing now FIGS. 2–9 in conjunction, it is seen that the constant-flow drip irrigation tape hose 18 includes an elongate hose body 24, which is formed of a single elongate strip 26 of plastic material (seen in FIGS. 8 and 9). This strip of plastic material will generally be 2 inches to about 4 inches wide, dependent upon the diameter of hose to be made, and will be from about 0.004 to about 0.020 inches thick. A variety of plastic polymers and copolymers are suitable for use in making the hose 18. For example, a blend of high and medium density polyethylenes may be used to make the strip 26 used in the fabrication of the hose 18. The strip 26 is wrapped on itself and is partially overlapped and sealed to itself adjacent to opposite longitudinal side edges 28, 30 (as is seen in FIGS. 8 and 9), to form an elongate tubular body. The tape hose body 24 conventionally has a pair of opposite side longitudinal creases 32 (only one of which is visible in FIG. 2) so that when the hose 18 is not subjected to internal water pressure, it collapses to a flat tape configuration. As is known, this flat tape configuration for drip irrigation hoses makes them easier to ship, to transport to and from fields, to arrange in the fields, and to roll up for removal from the fields after the growing season is ended.

Also, viewing FIG. 2, it is seen that the tape hose 18 defines a longitudinal primary water flow path 34, through which the irrigation water 20 flows. In order to provide the drip irrigation water flows, the tape hose 18 also defines a secondary water flow path 36, which is best seen in FIGS. 5 and 6, and which is generally indicated by the arrowed lead lines. The water flow path 36 is defined between overlapped and sealingly united opposite marginal edge sections 38, 40, of the strip 26, which are best seen in FIGS. 8 and 9. These opposite marginal edge sections 38, 40 are overlapped and are sealingly attached to one another by longitudinal adhesive beads 42, 44, seen in FIGS. 5, 6, and 9. As is seen in FIGS. 2, 5, and 6, these overlapped opposite marginal edge sections 38 and 40, define respective inner and outer wall portions (46, 48, respectively) of the secondary flow path 36.

Under operating conditions for the irrigation hose 18 in which the pressure of water flow 20 is in a first lower pressure range (as will be further described), the wall portions 46 and 48 are spaced radially apart to define a longitudinal pressure-responsive variable-area flow path 50 (as is seen in FIG. 6). The variable-area flow path 50 defines a part of the flow path 36. Also, the outer wall portion 48 defines a longitudinally-extending continuous serpentine protrusion 52 outwardly on the hose 18. This serpentine protrusion 52 is produced by embossing a longitudinal serpentine channel 54 (best seen in FIG. 8) into the strip 26 at the marginal edge section 38. Accordingly, the serpentine channel 54 communicates with the variable-area flow path 50, and also defines a part of the flow path 36. As FIG. 5 shows, during operating conditions for the hose 18 in which the pressure of water flow 20 is at or above a certain level, the inner wall portion 46 engages the outer wall portion 48 so that the variable area flow path 50 is essentially closed off. However, the serpentine channel 54 remains open so that the flow path 36 remains open with a comparatively smaller cross sectional area for the flow of water. In view of the above, it is seen that the secondary flow path 36 includes both a continuously open tortuous serpentine flow path portion 54, and a variable-area pressure-responsive flow path portion 50.

Water flow from the primary flow path 34 into the secondary flow path 36 is provided by a plurality of spaced apart port structures, generally indicated with the numeral 56, along the length of the hose 18. The port structure 56 is provided by forming a grouped plurality of individual ports 58 through the strip 26 in the marginal edge section 40, as is seen in FIGS. 2, 3, 4, 8, and 9. These ports 58 are formed by longitudinally slitting and embossing the strip 26 to form a group of inwardly extending oppositely-directed individual protrusions 60. The protrusions 60 are of a height slightly greater than the thickness of the strip 26 so that a small longitudinally-extending port opening 58 is provided at each protrusion 60. As FIG. 3 shows, the ports 58 are longitudinally extending so that the water flow 20 in the primary flow path 34 of the hose 28 is parallel with and across the face 62 of the ports 58. This disposition for the ports 58 is believed to significantly reduce the occurrence of contaminants in the water flow 20 becoming lodged in and clogging the ports 58. Also, because the protrusions 60 extend into the primary flow path 60, during flushing water flow conditions the protrusions 60 each cause their own turbulence or vorticity in the rapidly flowing flushing water. Consequently, the vorticity from the protrusions 60 assists in scrubbing contaminants from the interior of the hose 18 in the area of the ports 58.

Similarly, dripping water flow from the secondary flow path 36 outwardly of the hose 18 (i.e., at the dripping sites 22) is provided by a plurality of spaced apart V-shaped outlet ports 64 formed in the marginal edge section 38 of the strip 26 (viewing FIG. 8 especially) by corresponding V-shaped slits. The outlet ports 64 include a flap portion 66 which is flexibly attached to the strip 26 between the sides of the V-shaped slits which define the ports 64. These flap portions 66 are normally disposed generally in the plane of the strip 26 and close the port 64. However, the flow of irrigating water from within the hose 18 outwardly of the ports 64 is effective to lift the flaps 66 sufficiently to allow this flow (viewing FIGS. 2, 5, 6, and 9). Also, the ports 64 are of sufficient size to pass any contamination which reaches this port via the flow path 36. Flaps 66 are sufficiently compliant to allow contamination which does reach the ports 64 via the secondary flow path 36 to be ejected by the dripping water flow.

On the other hand, when water is not flowing outwardly via the ports 64, the flaps 66 close these ports so that environmental water does not reflux into the hose 18. Additionally, the flaps 66 at ports 64 are sufficient to discourage small plant roots from growing into the hose 18. It will be understood that the ports 56 between the primary flow path 34 and the secondary flow path 36 alternate along the length of the hose 18 with the outlet ports 64. Consequently, water flow into the flow path 36 via the ports 58 may flow in either direction along the length of the hose 18, as is indicated by the arrows on FIGS. 3 and 9.

Further consideration now of FIGS. 5 and 6 along with FIG. 7 will reveal that the combination secondary flow path 36 of the present drip irrigation tape hose 18 provides an operating range of internal water pressures for the hose within which the rate of dripping water flow from the hose is nearly constant. In other words, near the manifold pipe 14, the pressure of the flowing water 20 will be the highest. As is indicated in FIG. 5, under these pressure conditions, the wall portion 46 is forced by internal water pressure in the primary flow path outwardly into engagement with the outer wall portion 48. Consequently, the flow path 36 includes only the constant-area section provided by the tortuous serpentine channel 54, which is turbulent in flow characteristic. As FIG. 7 shows, the serpentine channel 54 would provide a water flow from the outlet port 64 represented by the line 68.

However, at a distance from the manifold pipe along a run of the hose 18, the water pressure will be lower, and the inner wall 46 will be spaced from the outer wall 48 (as seen in FIG. 6) because of the resilience and elasticity of the material from which the hose 18 is fabricated. Under these pressure conditions, the secondary flow path 36 includes the variable area portion 50, providing a turbulent flow characteristic due to the labyrinthine passage caused by the serpentine embossments forming the channel 54. That is, the flowing water in the portion 50 of the secondary flow path flows longitudinally of the tape hose 18, crossing repeated ridges and valleys formed by the switchbacks in the serpentine channel 54. FIG. 7 shows with a line 70 the dripping water flow from the outlet ports 64 which would be provided by the variable-area portion 50 along. A line 72 on FIG. 7 shows the total of the water flows from outlet ports 64 which is provided by the combination of the constant area flow channel 54 and variable-area flow portion 50 of the flow path 36. As is seen on FIG. 7, within a pressure range indicated with the numeral 74, the hose 18 provides a nearly constant dripping water flow rate from the dripping sites 22 regardless of the pressure of the internal water flow 20 within the hose 18. Consequently, over an extended length of the hose 18, the irrigated plants 12 receive substantially the same amount of irrigation water despite the pressure drop within the hose 18 with increasing distance from the manifold pipe 14. Within the pressure range indicated with the numeral 74, the present drip irrigation hose approaches the x=0 value of the idealized irrigation hose discussed above.

An additional advantage of the present drip irrigation hose 18 becomes apparent when one considered what happens at the secondary flow path 36 when the water flow 20 is turned off, and is then turned back on again. This off/on sequence for the water flow 20 may occur when the end of one day of irrigation is followed by the start of the next day, for example. When the water flow 20 is turned off and pressure within the hose 18 is relieved, the secondary flow path 36 expands toward its condition seen in FIG. 6. Consequently, any contamination which has entered this-secondary flow path is loosened. When the water flow and pressure are turned back on, the loosened contamination will be flushed from the secondary flow path 36 and out the outlet port 64.

FIGS. 8 and 9 illustrate steps in the making of hose 18 from strip 26. As is seen, the strip 26 is longitudinally embossed to provide the serpentine protrusion 52 and opposite serpentine channel 54. Similarly, longitudinal embossing of the strip 26 provides the protrusions 60, with adjacent slitting providing the ports 58. However, the strip 26 is also longitudinally embossed to provide longitudinal grooves 76–82. As is seen in FIG. 9, the grooves 76 and 80 cooperate with one another to provide a longitudinal space for the adhesive bead 44. Grooves 78 and 82 similarly cooperate with one another to provide space for adhesive bead 42. FIG. 9 illustrates the condition of the strip 26 after the adhesive beads 42 and 44 have been applied and preparatory to completion of the overlapping of the marginal edge sections 38, 40, and sealing of these sections to one another.

FIGS. 3 and 8 also illustrate another feature of the present drip irrigation hose 18 which is important when the hose is flushed out as described above. During such flushing of the hose, the water flow 20 therethrough is much faster and more vigorous than is the case during irrigating use of the hose 18. Consequently, the disposition of the ports 58 allows a vigorous water flow across the faces 62 so than contamination is swept away. In order to improve further the scrubbing action of the high speed vigorous water flow at the ports 58, the strip 26 is embossed with a vortex-shedding structure 84 longitudinally spaced upstream slightly from and axially aligned with each end port structure 56. As is seen in FIGS. 3 and 8, this vortex shedding structure 84 may take the form of a cylindrical inwardly extending protrusion formed in the inner wall portion 46. During flushing of the hose 18, the water flow will be sufficiently vigorous that the structure 84 will shed a series of vortices, which will sweep downstream and across the ports 58. These vortices will form a vortex street from each lateral side of the protrusion 84, which vortex street is indicated on FIG. 3 with the numeral 84'. The vortices of the vortex streets 84' pass downstream along the ports 58 and will help scrub away contamination accumulated in the area of the port structure 56. Two structures 84 are provided, one at each end of the port structure 56 because the hose 18 may be used with water flow in either direction.

Figure 10:
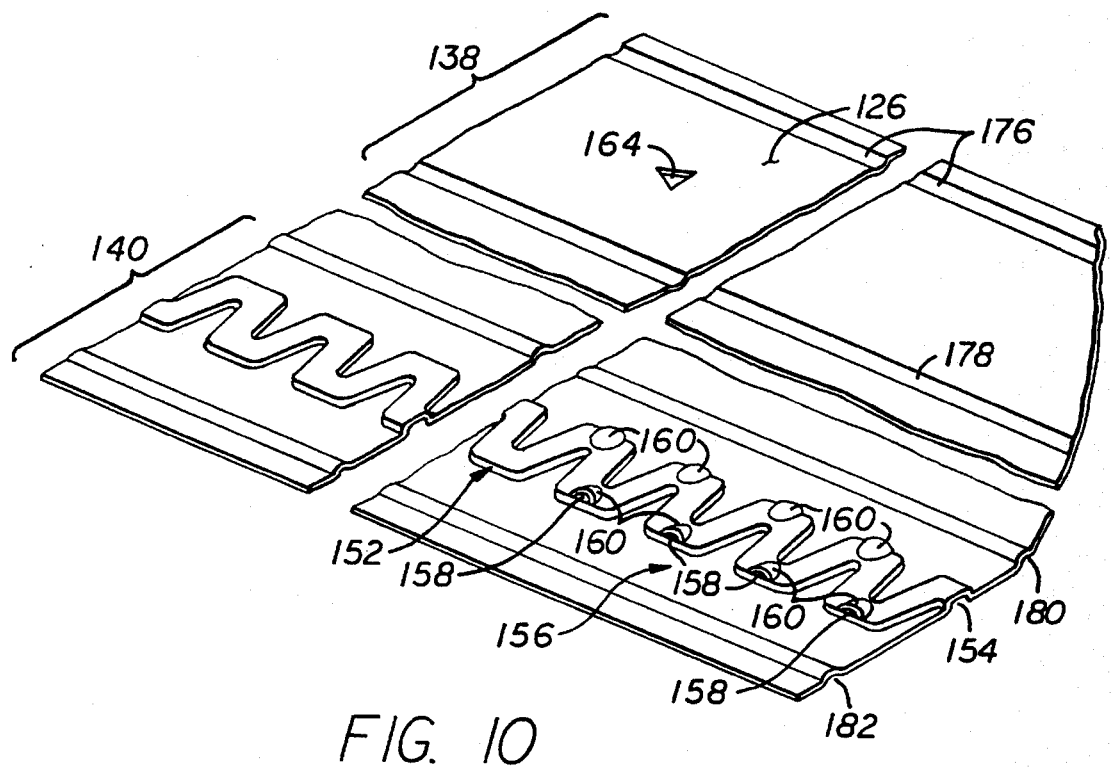
FIGS. 10 and 11 illustrate steps in the process of making an alternative embodiment of the present constant-flow drip irrigation tape hose, which embodiment is functionally equivalent to the embodiment of FIGS. 1–9.
Figure 11:
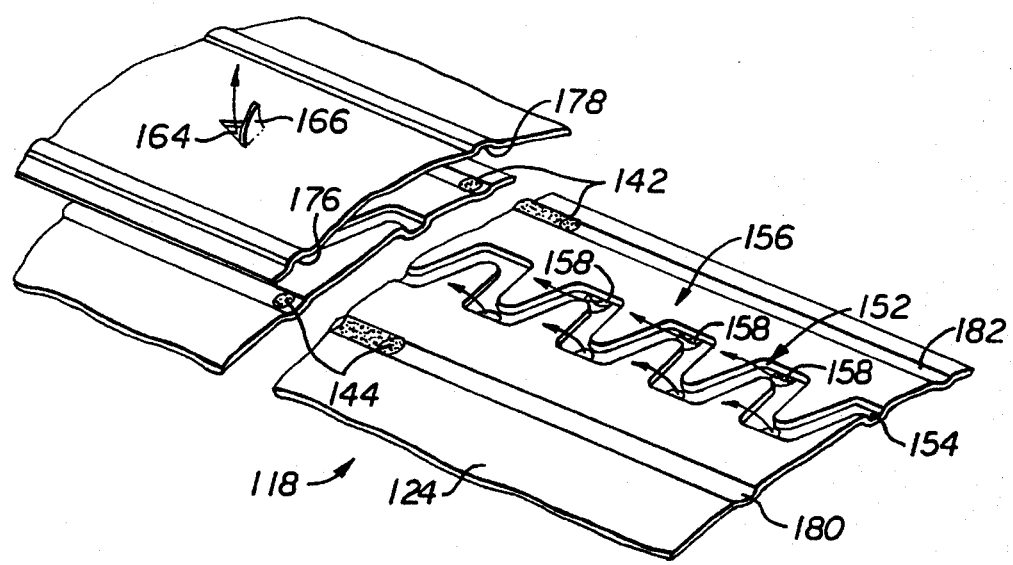

FIGS. 10 and 11 illustrate steps in the making of another embodiment of the drip irrigation hose according to the present invention. The hose embodiment made as illustrated in FIGS. 10 and 11 is functionally equivalent to the hose of FIGS. 1–9, but has a smooth outer wall (i.e., without an outwardly visible serpentine protrusion 52 as is seen in FIG. 2). In order to obtain reference numerals for use in describing the embodiment of FIGS. 10 and 11, features of these Figures which are analogous in structure or function to features described above are referenced with the same numeral used above and having one-hundred (100) added thereto. The embodiment of constant-flow drip irrigation hose shown in FIGS. 10 and 11 is formed from an elongate strip 126 of material with the marginal edge section 138 having only the longitudinal grooves 176 and 178, and spaced apart outlet ports 164. The other marginal edge section 140 includes an inwardly extending serpentine protrusion 152, which provides an outwardly disposed serpentine channel 154. Alternating along the length of the strip 126 with the outlet ports 164, are the port structures 156. In this case, the plural ports 158 of the port structures 156 are spaced sufficiently apart and are relatively positioned with the serpentine channel 154 so that the ports 158 are disposed atop the backbends of the serpentine channel 154.

The marginal edge sections 138 and 140 are overlapped and sealingly attached to one another so that the substantially smooth section 138 is the outer one of these marginal edge sections, as is seen in FIG. 11. An advantage of the embodiment seen in FIGS. 10 and 11 is that the entire circumferential outer wall of the irrigation hose 118 is substantially smooth. Accordingly, hoop stresses created in the hose by internal water pressure are carried by a wall structure which is substantially free of stress concentrators (except for the outlet ports 164). Thus, the embodiment of FIGS. 10 and 11 is better suited for irrigation uses in which the pressure of the irrigation water will be rather high.

FIGS. 12–15 illustrate yet another alternative embodiment of the present constant-flow drip irrigation tape hose in which the outer surface of the hose is substantially smooth, and is without a longitudinally extending serpentine protrusion as was seen in the embodiment of FIGS. 1–9. In order to obtain reference numerals for use in describing the embodiment of FIGS. 12–15, features of this embodiment which are the same as or which are functionally analogous to features depicted and described in a preceding Figure are referenced with the same numeral used above and increased by two-hundred (200).

Viewing FIG. 12 an irrigation hose 218 is seen which includes plural longitudinally spaced and sealingly separate drip flow-rate water-metering secondary flow paths 236. The longitudinally extending serpentine protrusion 252 and serpentine channel 254 of this embodiment are not longitudinally continuous. Viewing FIG. 13, it is seen that the marginal edge sections 238 and 240 each include respective longitudinal grooves 276–282, similarly to the hoses described above. These grooves 176–282 likewise receive beads of adhesive to sealingly bond the edge sections 238 and 240 to one another in overlapping relation. However, the marginal edge sections 238 and 240 also include longitudinally spaced apart matching transverse grooves 86 and 88.

These grooves 86 and 88 also receive a transverse bead 90 of adhesive (best seen in FIG. 14). The adhesive beads 90 sealingly separate adjacent secondary flow paths 236 into discreet longitudinal drip flow-rate metering sections.

At one end, these discreet drip flow-rate metering sections 236 include a respective port structure 256, similar to that described above with reference to FIGS. 10 and 11. At the opposite end of each discreet metering section, the marginal edge section 238 defines an outlet port 264. However, this outlet port 264 is defined by a star burst cut through the strip 226. That is, the outlet port 264 includes a plurality of V-shaped flaps 266 (as are seen in FIG. 13. The flaps 264 cooperatively close the outlet port 264, but will open sufficiently widely to allow contamination to pass outwardly through this port. Congruent with the outlet port 264 is a basin termination portion 92 of the serpentine channel 254. That is, the serpentine channel 254 communicates into the basin portion 92.

Also congruent with the outlet port 264 and centered under the flaps 266 is a flat-topped island 94 in the basin 92. This island 94 is formed by a reentrant of the embossed groove which forms the serpentine channel 254 and basin 92. As is shown by FIG. 15, this flat-topped island feature 94 in basin 92 is effective to inwardly support the plural flaps 266 of the outlet port 264 when these flaps are not being opened by outward water flow. Consequently, the outlet port 264 is effectively sealed with respect to reflux into the hose 218 of environmental water, and plant roots are also prevented from entering the secondary flow path 236.

An advantage of the embodiment of the present invention shown in FIGS. 12–15 is that because each outlet port is fed irrigation water by a single length of serpentine channel 254 and by a single port structure 256, the sizes of these features may be made as large as is practicable in view of the desired drip metering rate of a particular hose. Consequently, the hose of FIGS. 12–15 will be particularly resistant to clogging by contamination in the irrigation water. For example, the serpentine channel 254 may be made twice as large in cross sectional flow area, or larger, than the channel 54 illustrated in FIGS. 1–9, for a particular rate of drip flow from the hose 218.

Figure 16:
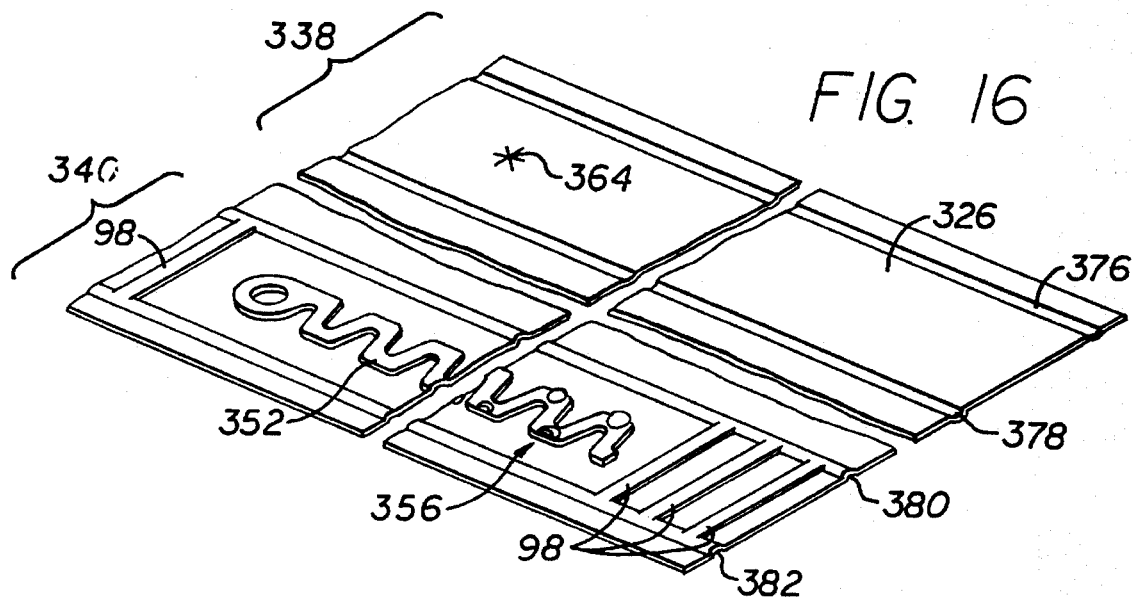
FIG. 16 illustrates a step in the process of making an alternative embodiment of the present constant-flow drip irrigation tape hose, which is similar to the embodiment seen in FIGS. 12–15.

FIG. 16 illustrates another alternative embodiment of the present invention. In order to obtain reference numerals for use in describing this embodiment of the invention, the familiar numerals are again increased by one-hundred (by 300 with respect to the numerals used on FIGS. 1–9). The drawing Figure illustrates a strip 326 which is similar to strip 226 described above. However, rather than sealingly separate adjacent drip flow-rate water-metering secondary flow paths 336, these adjacent flow paths are simply separated by a labyrinth said feature 96. The use of a labyrinth seal feature eliminates the need to apply the transverse adhesive beads 90. The labyrinth seal feature 96 is formed by plural transverse embossed protrusions 98, which form corresponding alternating lands and grooves (not seen in the drawing Figures) inwardly of the secondary flow path 336. The labyrinth seal structure 96 is effective to insure unidirectional flow of metering water in the discreet secondary flow paths 236. Accordingly, the advantage of being able to form the inlet port structure 356, serpentine 354, and outlet port 364 all as large as is practicable in view of the desired dripping water outflow rate so that clogging of the hose is reduced.

Figure 19:
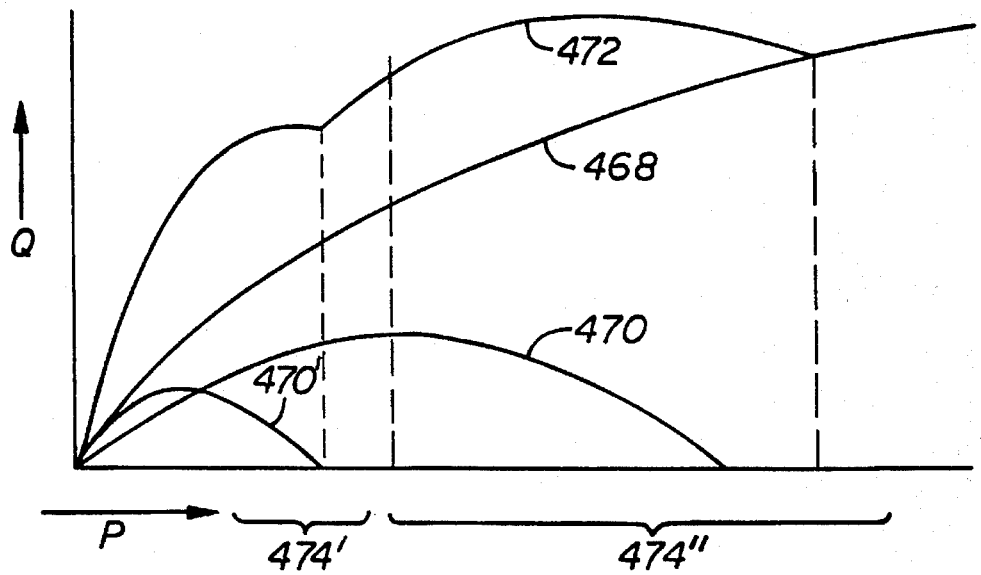
FIG. 19 graphically presents the operation of the constant-flow drip irrigation tape hose seen in FIGS. 17 and 18.
Figure 17:
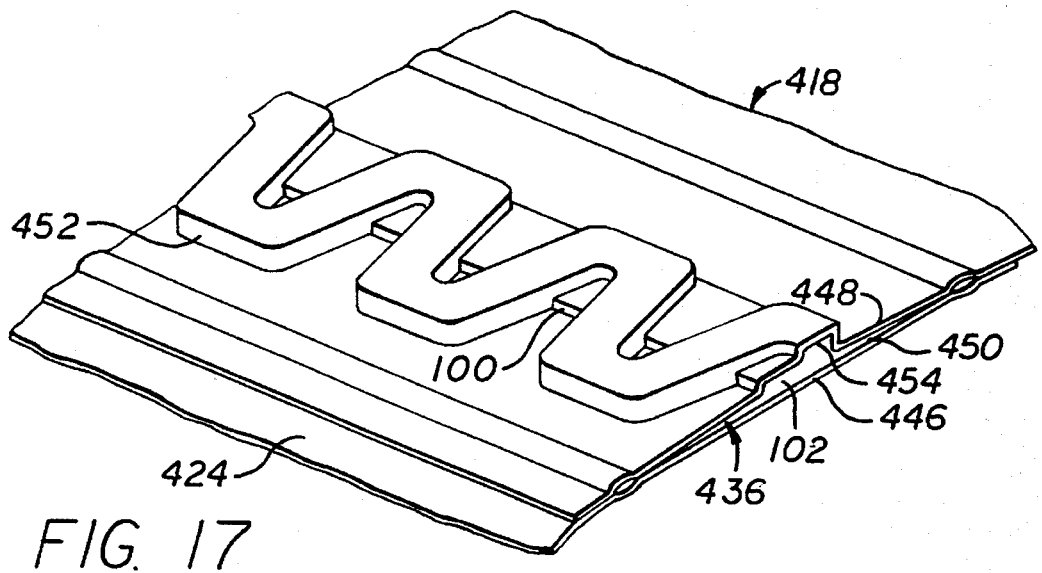
FIGS. 17 and 18 provide respective perspective and transverse sectional views of another alternative embodiment of the constant-flow drip irrigation according to the present invention, which embodiment provides two alternative constant-flow drip irrigation ranges dependent upon the internal water pressure provided to the hose.
Figure 18:
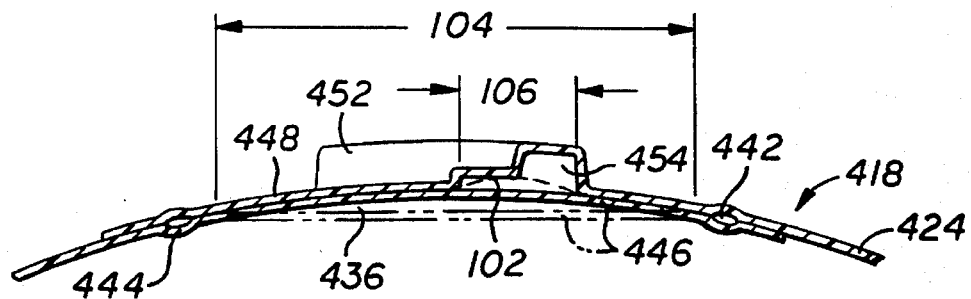

Yet another alternative embodiment of the present invention is illustrated by FIGS. 17 and 18, with the water flow characteristic of this hose as a function of applied water pressure being presented in FIG. 19. Reference numerals for use in describing familiar features of this embodiment are increased by 400 with respect to the numeral used to reference the same or analogous features of the first embodiment of the invention. FIGS. 17 and 18 show a drip irrigation hose 418 with an outwardly exposed longitudinally continuous serpentine protrusion, similarly to the hose of FIGS. 1–9. This hose includes port structures 456 and outlets 464 (not seen in the drawing Figures) like the embodiment of FIGS. 1–9. However, the embodiment of FIGS. 17 and 18 also includes a longitudinally continuous embossed protrusion 100, providing a corresponding longitudinally continuous groove 102 inwardly of the secondary flow path 436. Because of the groove 102, the serpentine channel 454 is not of constant area along its tortuous length, but is constantly open as will be seen.

As is illustrated by the solid-line, dash-and-dot line, and dashed-line alternative positions for the inner wall portion 446 in FIG. 18, this wall may occupy a low pressure position (dashed-and-dot lines in FIG. 18, and as seen in FIG. 17), an intermediate pressure position (solid lines), or a high pressure position (dashed lines). Consequently, when the irrigation hose is provided with low pressure water, the variable-area portion 450 of the secondary flow path 436 will have a width as seen in FIG. 17, and as indicated by the reference numeral 104 in FIG. 18. At an intermediate pressure level, the inner wall portion 446 will engage the outer wall portion 448 so that the secondary flow path is reduced in area and has a width indicated by the numeral 106 in FIG. 18. An additional increase in water pressure will result in the inner wall portion 446 conforming more closely to the shape of the outer wall portion 448 so that the elongate groove 102 is also closed by the inner wall portion 446. Consequently, the secondary flow path 436 thereafter has a minimum area as is seen in FIG. 18 referenced with the numeral 454. This serpentine channel 454 does not have a constant cross sectional flow area along its tortuous length, but has a series of area minima as seen in FIG. 18.

FIG. 19 graphically illustrates the resulting water flow characteristics for the hose 418 seen in FIGS. 17 and 18. As can be seen, a line 468 represents the water output which would be provided by the serpentine channel 454 alone. A line 470 represents the water output which would be provided by the portion of variable area flow path 450 exclusive of the area of longitudinal groove 102. Another line 470' represents the water flow rate which would be provided by the portion of the variable-area flow path 450 defined by groove 102 alone. By addition of these individual water flow rates, the line 472 represents the total water drip output flow rate provided by the hose 418. As can be easily seen, the hose 418 provides a low-pressure range (474'), and a high pressure range (474"), within which the water drip output rate of the hose is substantially uniform despite a considerable difference in water pressure level within the hose. The result is that the hose 418 allows a user to irrigate row plants at either one of two watering rates dependent upon the water pressure level which the user supplies to the inlet end of a run of the hose. Within either of the constant-flow pressure ranges of the hose 418, the plants along a considerable length of the hose will receive substantially the same amount of water. That is, within the two water pressure ranges indicated, the irrigating hose of this embodiment approaches the x=0 value of an idealized irrigation hose.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. For example, it is apparent that the sealing lines of the present embodiments may be effected in a variety of ways other than the use of adhesive beads as disclosed. These sealing lines could be effected by using ultrasonic or thermal welding of the plastic material of the hose wall to itself, for example. Thus, the depicted and described preferred embodiments of the invention are exemplary only, and are not exhaustive of the scope of the invention. Consequently, the invention is intended to be limited only by the spirit and scope of the appended claims, giving full cognizance to equivalents in all respects.

We claim:

1. A constant-flow drip irrigation hose of the type having an elongate primary water flow path extending therethrough and a secondary flow path extending from said primary flow path to open outwardly of said hose, said drip irrigation hose comprising;

a hose body with a wall circumscribing and bounding said primary flow path, said wall including a first wall portion and a second wall portion which are circumferentially overlapped and sealingly connected to one another to define said secondary flow path therebetween, one of said first wall portion and said second wall portion defining a tortuous continuously-open channel forming a first part of said secondary flow path, and said first and said second wall portions being variably spaced from one another to define a variable-area second part of said secondary flow path, one of said first wall portion and said second wall portion being pressure-responsive to move toward the other of said first wall portion and said second wall portion to constrict said variable-area second part of said secondary flow path in response to increasing water pressure within said hose;

with one of said first wall portion and said second wall portion additionally defining a longitudinally-extending groove defining a third variable-area part of said secondary flow path, and one of said first wall portion and said second wall portion being further pressure-responsive and movable toward the other of said first wall portion and said second wall portion to constrict said variable-area third part of said secondary flow path in response to increasing water pressure within said hose after said variable area second part of said secondary flow path has been substantially closed.

2. The drip irrigation hose of claim 1 wherein said tortuous continuously-open channel is of serpentine configuration.

3. The drip irrigation hose of claim 2 wherein said continuously open serpentine channel communicates at one end thereof with a basin, said basin being aligned with an outlet port of said hose which is defined by the other one of said first wall portion and said second wall portion.

4. The drip irrigation hose of claim 1 wherein said first wall portion and said second wall portion are sealingly connected to one another at circumferentially spaced apart longitudinal sealing lines disposed on opposite sides of said secondary flow path.

5. The drip irrigation hose of claim 4 wherein said first wall portion and said second wall portion are additionally sealingly interrelated to one another at longitudinally spaced apart circumferential labyrinth lines to inhibit secondary water flow between longitudinally adjacent sections of said secondary flow path.

6. The drip irrigation hose of claim 4 wherein said circumferentially spaced apart longitudinal sealing lines are defined by matching longitudinal grooves in said wall, and a bead of adhesive material received in said grooves.

7. The drip irrigation hose of claim 4 wherein said first wall portion and said second wall portion are additionally sealingly connected to one another at longitudinally spaced apart circumferential sealing lines to sealingly separate longitudinally adjacent sections of said secondary flow path from one another.

8. The drip irrigation hose of claim 1 wherein said wall further defines a port structure communicating water flow from said primary flow path to said secondary flow path, said port structure including a plurality of slits along the one of said first wall portion and said wall portion bounding said primary flow path.

9. The drip irrigation hose of claim 8 wherein said port structure includes a protrusion extending inwardly of said primary flow path from the inner one of said first wall portion and said second wall portion, a longitudinal slit through said inner one of said wall portions adjacent to said protrusion, and said inner one of said wall portions being displaced inwardly at said protrusion a distance greater than the thickness of said one wall portion to open communication from said primary flow path to said secondary flow path.

10. The drip irrigation hose of claim 9 wherein said port structure includes a plurality of substantially identical protrusions and associated longitudinal slits opening communication between said primary flow path and said secondary flow path, said plurality of slits and protrusions being spaced longitudinally along said inner wall portion.

11. The drip irrigation hose of claim 10 wherein said plurality of substantially identical protrusions and associated longitudinal slits are alternately disposed in circumferentially opposite directions longitudinally along said inner wall.

12. The drip irrigation hose of claim 11 wherein said plurality of substantially identical protrusions and associated longitudinal slits are disposed in a staggered array longitudinally along said inner wall.

13. The drip irrigation hose of claim 9 wherein said tortuous continuously-open channel is of serpentine configuration and is defined by an inner one of said first wall portion and said second wall portion, said port structure including a plurality of substantially identical protrusions and associated longitudinal slits opening communication between said primary flow path and said secondary flow path, said plurality of slits and protrusions being spaced longitudinally along said inner wall portion, and said plurality of substantially identical protrusions and associated longitudinal slits also being alternately disposed in circumferentially opposite directions longitudinally along said inner wall so that said plurality of substantially identical protrusions and associated longitudinal slits are disposed in a staggered array longitudinally along said inner wall and are disposed atop said backbends of said serpentine channel.

14. The drip irrigation hose of claim 8 further including a vortex shedding structure disposed immediately upstream of and spaced from said slits of said port structure for shedding flow vortices during flushing of water through said hose, whereby said vortices shed from said structure sweep downstream in the flushing water flow forming a vortex street scrubbing across said port structure to remove contamination therefrom.

15. The drip irrigation hose of claim 14 including a pair of said structures for shedding vortices arranged one on each side of said port structure to allow bi-directional flushing water flow through said hose with attendant vortex scrubbing of said port structure irrespective of the direction in which the flushing water flows.

16. The drip irrigation hose of claim 14 wherein said vortex shedding structure includes the inner one of said first wall portion and said second wall portion defining a bluff cylindrical protrusion extending inwardly of said inner wall immediately upstream of said port structure.

17. The drip irrigation hose of claim 8 wherein said port structure includes a protrusion extending inwardly of said primary flow path from the inner one of said first wall portion and said second wall portion, said inner one of said first wall portion and said second wall portion defining an opening on said protrusion extending through said inner one of said wall portions to communicate with said secondary flow path, whereby said protrusion generates vortices during flushing water flow through said primary flow path to scrub contamination from said port structure.

18. The drip irrigation hose of claim 1 wherein said wall further defines an outlet port structure communicating water flow from said secondary flow path outwardly of said hose.

19. The drip irrigation hose of claim 18 wherein said outlet port structure includes an outer one of said first wall portion and said second wall portion defining at least a pair of slits intersecting to define both said outlet port and an integral shape-matching flap portion of said outer wall yieldably closing said outlet port, said flap portion yielding in response to water flow outwardly of said secondary flow path to permit said water flow to escape from said hose.

20. The drip irrigation hose of claim 19 wherein said outlet port structure includes an inner one of said first wall portion and said second wall portion defining a surface portion underlying said flap portion of said outer wall and resisting inward movement of said flap portion.

21. The drip irrigation hose of claim 20 wherein said surface portion underlying said flap portion is defined by a protrusion of said the inner one of said first wall portion and said second wall portion, said protrusion having a substantially flat outer end supportingly engaging said flap portion.

22. The drip irrigation hose of claim 1 wherein said additional longitudinally-extending groove is partially overlaid by said tortuous continuously-open channel.

23. A drip irrigation hose of the type having an elongate primary water flow path extending therethrough and a secondary flow path extending from said primary flow path to open outwardly of said hose, said drip irrigation hose comprising:

a hose body with a wall circumscribing and bounding said primary flow path, said wall including a wall portion defining said secondary flow path therein, said wall further defining a port structure communicating water flow from said primary flow path to said secondary flow path, and said port structure includes a protrusion extending inwardly of said primary flow path from said wall, said wall defining an opening on said protrusion extending through said wall to communicate with said secondary flow path, whereby said protrusion generates vortices during flushing water flow through said primary flow path to scrub contamination from said port structure.

24. The drip irrigation hose of claim 23 wherein said port structure includes a longitudinal slit through said wall on said protrusion, and said wall being displaced inwardly at one side of said slit a distance greater than the thickness of said wall to open communication from said primary flow path to said secondary flow path.

25. The drip irrigation hose of claim 24 wherein said port structure includes a plurality of substantially identical protrusions and associated longitudinal slits opening communication between said primary flow path and said secondary flow path, said plurality of slits and protrusions being spaced longitudinally along said wall.

26. A drip irrigation hose of the type having an elongate primary water flow path extending therethrough and a secondary flow path extending from said primary flow path to open outwardly of said hose, said drip irrigation hose comprising:

a hose body with a wall circumscribing and bounding said primary flow path, said wall including a wall portion defining said secondary flow path therein, said wall further defining a port structure communicating water flow from said primary flow path to said secondary flow path, and vortex-shedding structure means disposed immediately upstream of said port structure for shedding flow vortices during flushing of water through said hose, whereby vortices shed from said structure means sweep downstream in the flushing water flow forming a vortex street scrubbing across said port structure to remove contamination therefrom.

27. The drip irrigation hose of claim 26 including a pair of said vortex-shedding structure means for shedding vortices, said pair of structure means being arranged one on each side of said port structure to allow bi-directional flushing water flow through said hose with attendant vortex scrubbing of said port structure irrespective of the direction in which the flushing water flows.

28. The drip irrigation hose of claim 26 wherein said vortex-shedding structure means includes said wall defining a bluff cylindrical protrusion extending inwardly of said wall immediately upstream of said port structure.

29. A constant-flow drip irrigation hose of the type having an elongate primary water flow path extending therethrough and a secondary flow path extending from said primary flow path to open outwardly of said hose, said drip irrigation hose comprising;

a hose body with a wall circumscribing and bounding said primary flow path, said wall including a first wall portion and a second wall portion which are circumferentially overlapped and sealingly connected to one another to define said secondary flow path therebetween, one of said first wall portion and said second wall portion defining a tortuous continuously-open channel forming a first part of said secondary flow path, and said first and said second wall portions being variably-spaced from one another to define a variable-area second part of said secondary flow path, one of said first wall portion and said second wall portion being pressure-responsive to move toward the other of said first wall portion and said second wall portion to constrict said variable-area second part of said secondary flow path in response to increasing water pressure within said hose;

said wall further defining a port structure communicating water flow from said primary flow path to said secondary flow path, said port structure including a protrusion extending inwardly of said primary flow path from the inner one of said first wall portion and said second wall portion, said inner one of said first wall portion and said second wall portion defining an opening on said protrusion extending through said inner one of said wall portions to communicate with said secondary flow path, whereby said protrusion generates vortices during flushing water flow through said primary flow path to scrumb contaimination from said port structure.

30. A constant-flow drip irrigation hose of the type having an elongate primary water flow path extending therethrough and a secondary flow path extending from said primary flow path to open outwardly of said hose, said drip irrigation hose comprising;

a hose body with a wall circumscribing and bounding said primary flow path, said wall including a first wall portion and a second wall portion which are circumferentially overlapped and sealingly connected to one another to define said secondary flow path therebetween, one of said first wall portion and said second wall portion defining a tortuous continuously-open channel forming a first part of said secondary flow path, and said first and said second wall portions being variably spaced from one another to define a variable-area second part of said secondary flow path, one of said first wall portion and said second wall portion being pressure-responsive to move toward the other of said first wall portion and said second wall portion to constrict said variable-area second part of said secondary flow path in response to increasing water pressure within said hose;

said wall further defining a port structure communicating water flow from said primary flow path to said secondary flow path, said port structure including a protrusion extending inwardly of said primary flow path from the inner one of said first wall portion and said second wall portion, a longitudinal slit through said inner one of said wall portions adjacent to said protrusion, and said inner one of said wall portions being displaced inwardly at said protrusion a distance greater than the thickness of said one wall portion to open communication from said primary flow path to said secondary flow path.

* * * * *